United States Patent
Hahn et al.

(10) Patent No.: US 12,265,738 B2
(45) Date of Patent: Apr. 1, 2025

(54) REORDERING COMMANDS TO OPTIMIZE EXECUTION OF THE COMMANDS

(71) Applicant: Western Digital Technologies, Inc., San Jose, CA (US)

(72) Inventors: Judah Gamliel Hahn, Ofra (IL); Shay Benisty, Beer Sheva (IL); Alexander Bazarsky, Holon (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/357,753

(22) Filed: Jul. 24, 2023

(65) Prior Publication Data

US 2024/0385775 A1 Nov. 21, 2024

Related U.S. Application Data

(60) Provisional application No. 63/502,164, filed on May 15, 2023.

(51) Int. Cl.
*G06F 3/06* (2006.01)
(52) U.S. Cl.
CPC .......... *G06F 3/0659* (2013.01); *G06F 3/0625* (2013.01); *G06F 3/0679* (2013.01)
(58) Field of Classification Search
CPC ..... G06F 3/0659; G06F 3/0625; G06F 3/0679
See application file for complete search history.

(56) References Cited

U.S. PATENT DOCUMENTS

| 8,595,414 B2 | 11/2013 | Post et al. | |
|---|---|---|---|
| 10,089,266 B2 | 10/2018 | Sarcone et al. | |
| 10,761,774 B2 | 9/2020 | Alavoine et al. | |
| 11,126,254 B1 | 9/2021 | Segev et al. | |
| 2006/0129756 A1* | 6/2006 | De Jong | G11C 11/406 |
| | | | 714/E11.207 |
| 2016/0162186 A1 | 6/2016 | Kashyap et al. | |
| 2022/0043570 A1 | 2/2022 | Richter et al. | |
| 2022/0083274 A1* | 3/2022 | Cho | G06F 3/064 |
| 2022/0374159 A1 | 11/2022 | Traver et al. | |
| 2024/0248645 A1* | 7/2024 | Ishiguro | G06F 3/0679 |

* cited by examiner

*Primary Examiner* — Chie Yew
(74) *Attorney, Agent, or Firm* — PATTERSON + SHERIDAN, LLP; Steven H. VerSteeg

(57) ABSTRACT

Optimizing the time that a link is active in a data storage device is desirable. Changing the way the device processes commands will minimize the link uptime and maximize the time that the link can remain in a low power mode. The data storage device will control the command arbitration from the host to aggregate together command chunks as large as possible, such that will extend the link down durations, and won't need to wake the link up occasionally. In another approach the execution of commands from internal buffers of the host will be prioritized according to command-batch completion criteria, and not based on minimizing the latency of a single command.

19 Claims, 8 Drawing Sheets

REORDERING COMMANDS TO OPTIMIZE EXECUTION OF THE COMMANDS

CROSS-REFERENCE TO RELATED APPLICATIONS

This application claims benefit of U.S. provisional patent application Ser. No. 63/502,164, filed May 15, 2023, which is herein incorporated by reference.

BACKGROUND OF THE DISCLOSURE

Field of the Disclosure

Embodiments of the present disclosure generally relate to optimizing the link active durations in storage device systems.

Description of the Related Art

Today's convention for a peripheral component interconnect express (PCIe) interface handling in storage systems is based on the underlying assumption that the link is always up when commands are passed to the device (active). Therefore, the commands are executed in the best way from a performance optimization point of view. In that manner, the command aggregation is done by the pulling-in of all available commands from host submission queues, according to a deterministic schedule.

In many scenarios of the PCIe based storage systems, the PCIe interface of the host is much faster than the interface of a NAND. One outcome of these unbalanced interface rates between the host and the memory device is that the host interface will often be idle, which is problematic in terms of system power consumption.

Therefore, there is a need in the art for optimizing the link active durations in storage device systems, such that the link active time is minimized and power consumption is optimized.

SUMMARY OF THE DISCLOSURE

To avoid suboptimal power consumption without significant gain in performance, optimizing the time that a link is active in a data storage device is desirable. Changing the way the device processes commands will minimize the link uptime and maximize the time that the link can remain in a low power mode. The data storage device will control the command arbitration from the host to aggregate together command chunks as large as possible, such that will extend the link down durations, and won't need to wake the link up occasionally. In another approach the execution of commands from internal buffers of the host will be prioritized according to command-batch completion criteria, and not based on minimizing the latency of a single command.

In one embodiment, a data storage device comprises: a memory device; and a controller coupled to the memory device, wherein the controller is configured to: provide one or more pre-defined thresholds of host queue capacity to a host device; determine that one or more host queues has exceeded the one or more pre-defined thresholds; turn on a link between the host device and the data storage device; and fetch commands from the one or more host queues.

In another embodiment, a data storage device comprises: a memory device; and a controller coupled to the memory device, wherein the controller is configured to: retrieve a plurality of commands from one or more host queues, wherein the plurality of commands is a batch; reorder the plurality of commands to optimize execution of the plurality of commands; execute the plurality of commands; and return results of the batch to a host device.

In another embodiment, a data storage device comprises: means to store data; and a controller coupled to the means to store data, wherein the controller is configured to: turn on a link between a host device and the data storage device upon determining that one or more queues of the host device has exceeded one or more thresholds; fetch a plurality of commands from one or more queues; reorder the plurality of commands to optimize execution of the plurality of commands; execute the plurality of commands; and return results of the plurality of commands to the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

To avoid suboptimal power consumption without significant gain in performance, optimizing the time that a link is active in a data storage device is desirable. Changing the way the device processes commands will minimize the link uptime and maximize the time that the link can remain in a low power mode. The data storage device will control the command arbitration from the host to aggregate together command chunks as large as possible, such that will extend the link down durations, and won't need to wake the link up occasionally. In another approach the execution of commands from internal buffers of the host will be prioritized according to command-batch completion criteria, and not based on minimizing the latency of a single command.

Figure 1:
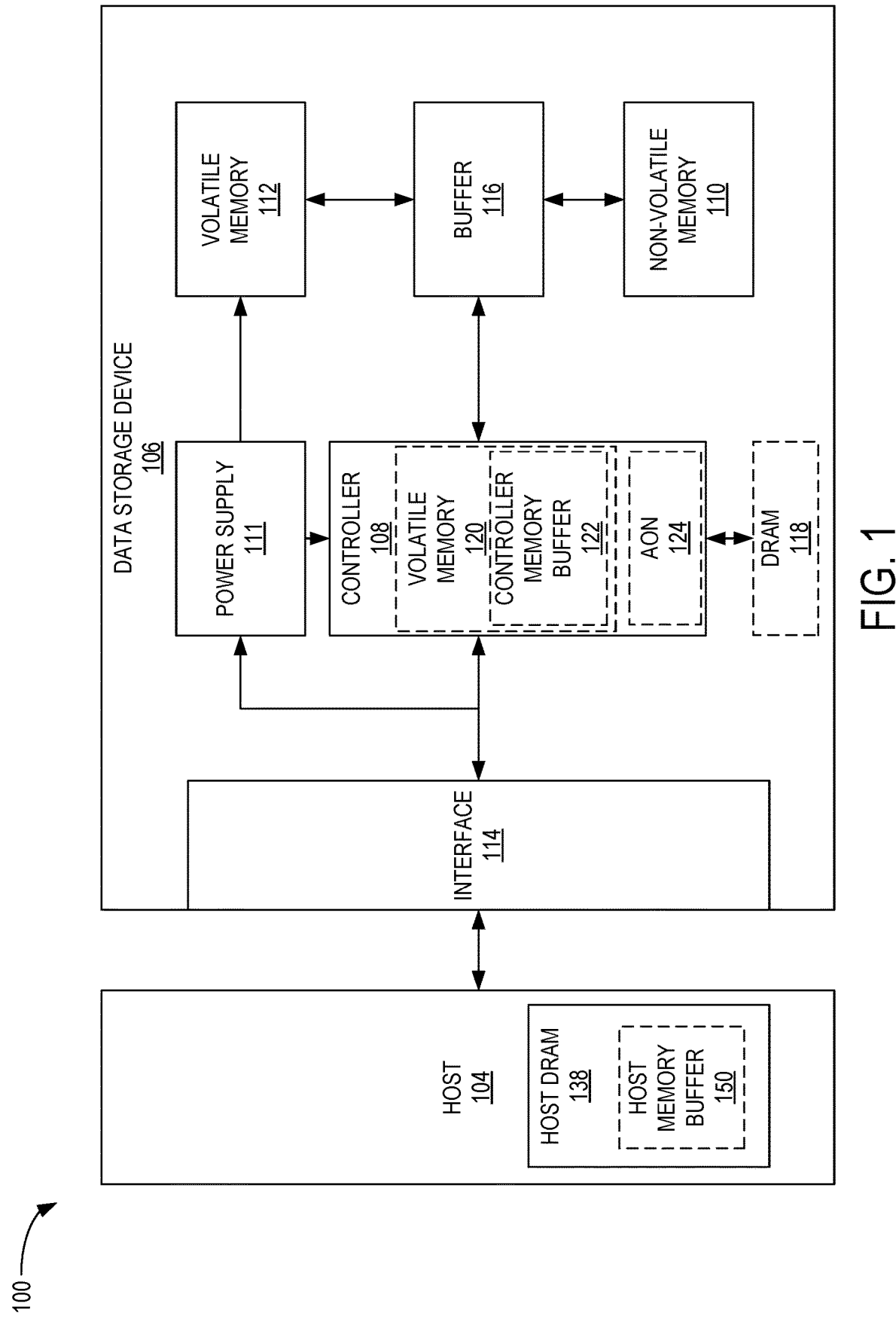
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with a protocol such as non-volatile memory express (NVMe). Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM or always on memory (AON) 124. The controller 108 may allocate a portion of the optional second volatile memory to the host device 104 as controller memory buffer (CMB) 122. Furthermore, there may be additional volatile memory that is neither AON 124 nor CMB 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
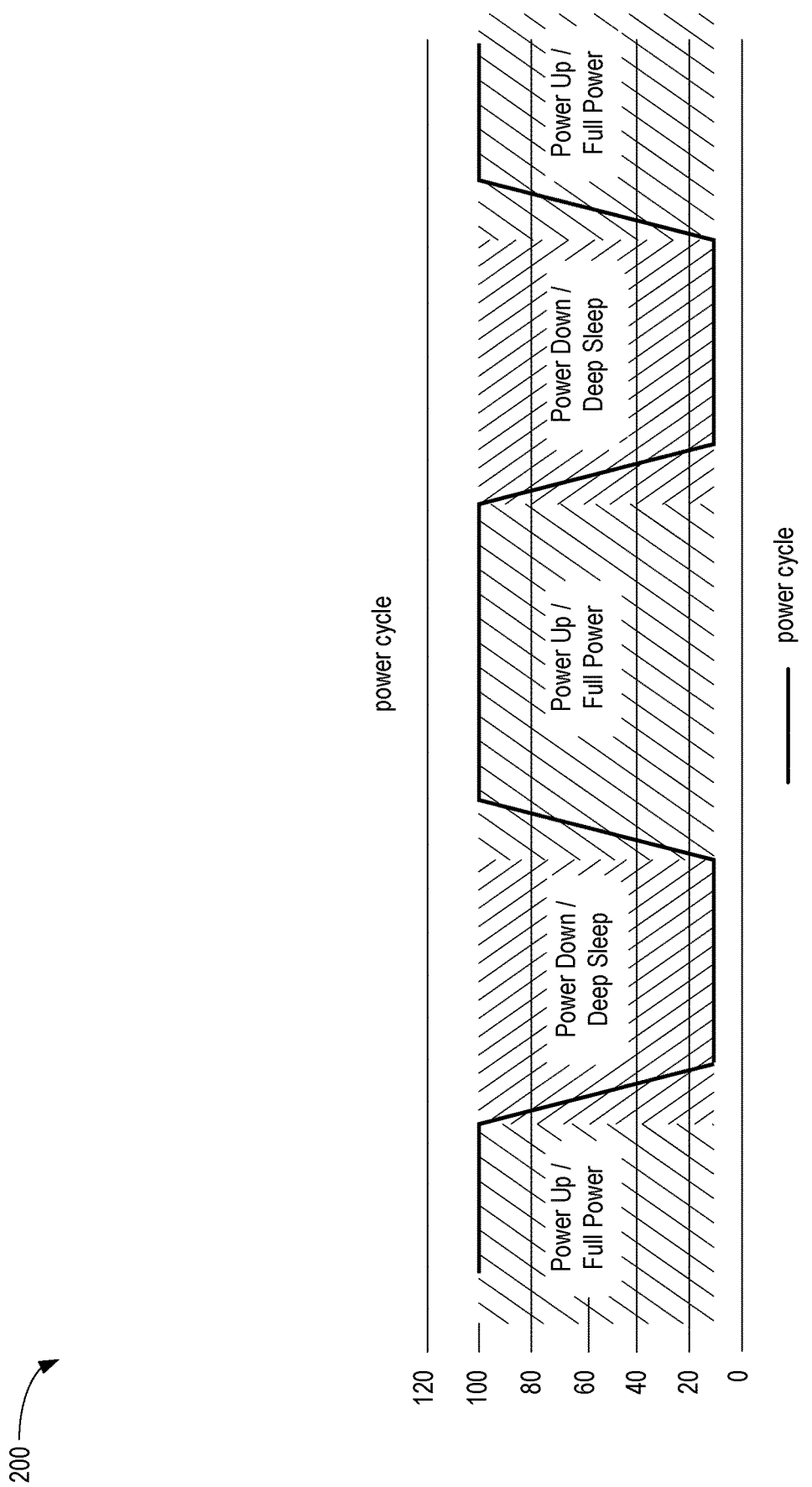
FIG. 2 shows an example of power duty cycle mode, according to an exemplary embodiment.

FIG. 2 shows an example of power duty cycle mode 200, according to an exemplary embodiment. The motivation is to work with full power consumption during the power-on window and be in deep sleep mode during the power-off window. The motivation is also to reduce the latency when switching between the modes so better power and performance results will be presented.

When turning off power, the controller, such as controller 108 of FIG. 1, needs to leave as little trail as possible from actions that have been initiated. Any trail will have to be kept in AON such as AON 124 of FIG. 1, making the AON big and power consuming. As a result, when going into power mode, the device takes time until the device can go into power mode.

It is desirable to utilize the common interface rate mismatch for optimizing the link active durations in data storage device systems such that the link active time is minimized and by that, so is the power consumption.

Figure 3:
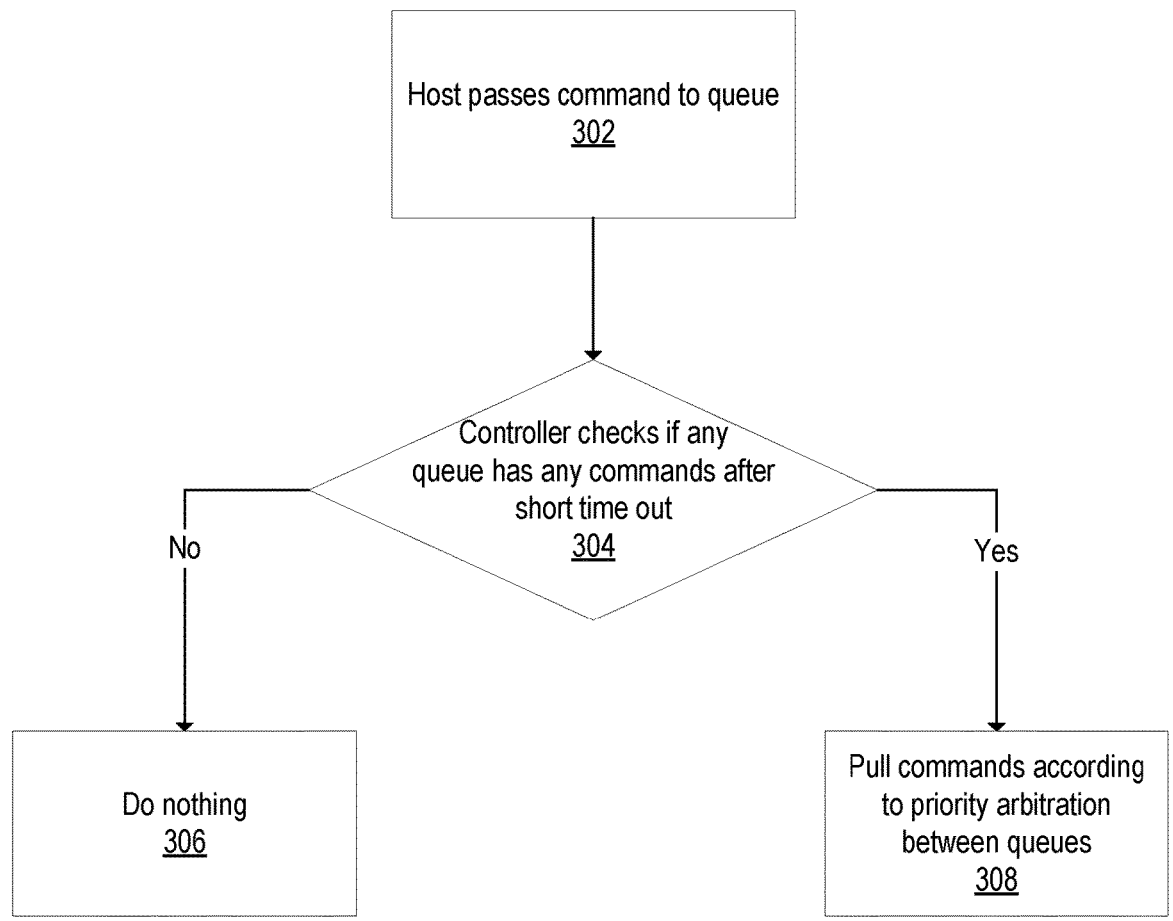
FIG. 3 is a flow chart illustrating a method for command arbitration, according to certain embodiments.

FIG. 3 is a flow chart illustrating a method 300 for command arbitration, according to certain embodiments. The method 300 begins at block 302. At block 302 the host, such as host 104 of FIG. 1, passes a command to a queue. At block 304, the controller, such as controller 108 of FIG. 1, determines if any queue has any commands after a short time out. If the controller determines there are no commands after the short time out, then the method 300 proceeds to block 306. At block 306 the controller does nothing. If the controller determines that there are commands after the short time out, then the method 300 proceeds to block 308. At block 308, the controller pulls commands according to priority arbitration between queues.

Based upon the always-up link assumption, the command fetching method and arbitration defined by the standard is sufficient. However, in practice, in many PCIe systems, the interface rates of the host and the memory device (e.g., NAND) are highly uncorrelated and therefore the default arbitration method defined by the standard is expressed in long idle durations in the link which explicitly causes suboptimal power consumption without significant gain in performance. As discussed herein, changing the way the data storage device pulls and processes commands (fetching/processing/executing) to minimize link uptime, reduces power consumption with minimal impact on performance.

In order to optimize the time that the link is active, the way that the data storage device processes commands is changed. For example, changing the command fetching, command processing, and/or command executing to minimize the link uptime and maximize the time that the link can remain in a low power mode such as L1.2. The overall results are expected to produce burst-activated minimized link up duration with an overall reduced power consumption with minimal impact on performance.

Figure 4:
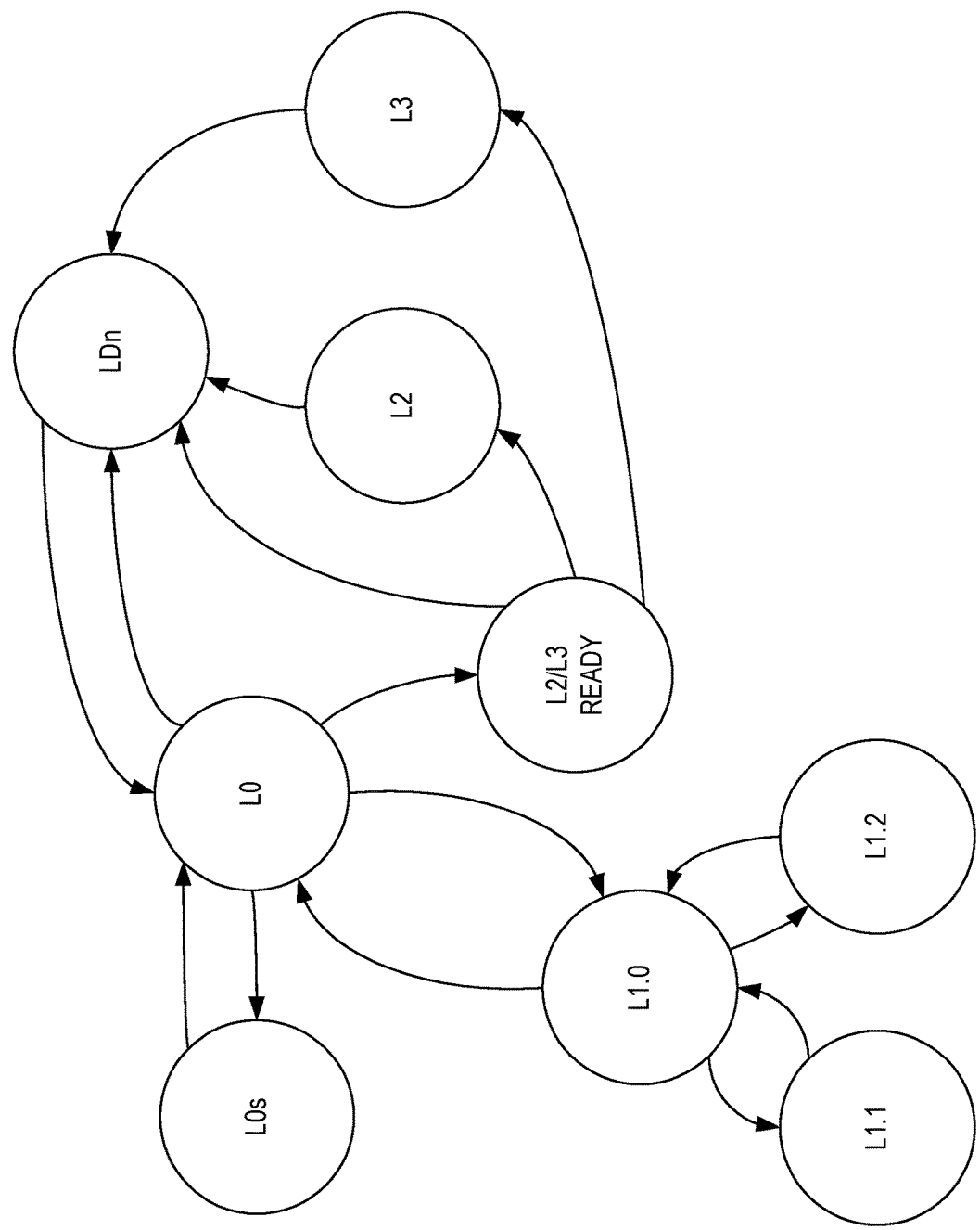
FIG. 4 is an illustration of a link state flow diagram, according to certain embodiments.

FIG. 4 is an illustration of a link state flow diagram 400, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state. Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 400 may be available and more or less low power link states may be applicable to the embodiments described herein.

Link states are numbered sequentially, where higher numbers represent lower power requirements due to a greater number of offline circuits and corresponding higher exit latencies. The relevant link states are L0, L0s, L1, and L1.2. L2 and L3 are functionally identical except that Vaux is available in L2. Both have main power rails disabled and the controller 108 is fully powered off (except for whatever may be powered by Vaux). Client SSDs (which use aggressive link power management) do not support Vaux, so L3 is the same as L2. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, L0s and L1 may have a lower functionality than that of L0. For example, L0s has a similar power requirement as that of the L0, but only allows for a serial link in one direction. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that auxiliary power has not been yet removed from the L2 link state. Furthermore, the memory devices of the NVM 110 that are not used are placed in a non-operational link state, L2 and L3, to limit the idle power consumption to a minimal value.

In order for I/O commands to occur, the link, such as a data bus, between the host device 104 and the controller 108 is woken up and placed into the L0 link state. The most common state for idle is L1.2. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104).

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1SS, the link remains operational and requires less power to return to a more operational state, such as L1.0 or L0. Furthermore, the L1SS requires less time than the L2 and/or the L3 link states to return to a full active link state L0. It is to be understood that "link state" may be referred to as "power state" herein for exemplary purposes.

A device will always fetch commands from the host's queues (assuming that the host's submission queues have outstanding commands). The fetching is done according to a prioritization order that was pre-defined by the host. For example, if the host defined three queues with using weighted round robin arbitration, the device may continuously fetch commands from submission queues. The device will fetch three commands from a first submission queue, two commands from a second submission queue, and one command from a 3rd queue. This will continue as long as there is room in the device command queue, such that as soon as command slots in the device itself free up. The command slots will immediately be filled with the next command structures from host submission queues according to the requested arbitration pattern. The default fetching method assumes that the link is always up, and as such ignores link-up time minimization considerations.

As discussed herein, the data storage device will control the command arbitration from the host to aggregate together command chunks as large as possible, such that we will extend the link down durations, and won't need to wake the link up occasionally. The controller will still honor host arbitration settings by keeping the ratio and weights between queues. For instance, instead of issuing this arbitration scheme of one, two and three commands. The controller may fetch more commands in one chunk e.g. 15, 30, and 45 (the ratio of 1:2:3 is still maintained).

A basic implementation of the concept of command aggregation during fetching can be done by providing a pre-defined threshold of host queues capacity. Once one or more of the queues exceeds the threshold, the link will be turned on and command fetching will be initiated. The predefined prioritization of fetching from the different command queues will be kept, but will be triggered only when fetching is on. Since the fetching arbitration may be paused for a long time, there will be many commands waiting in the queues. At the host side, the command fetching will be done in burst mode. The command fetching will allow for burst throughput while allowing for lower link power, at the expense of individual command latency.

Figure 5:
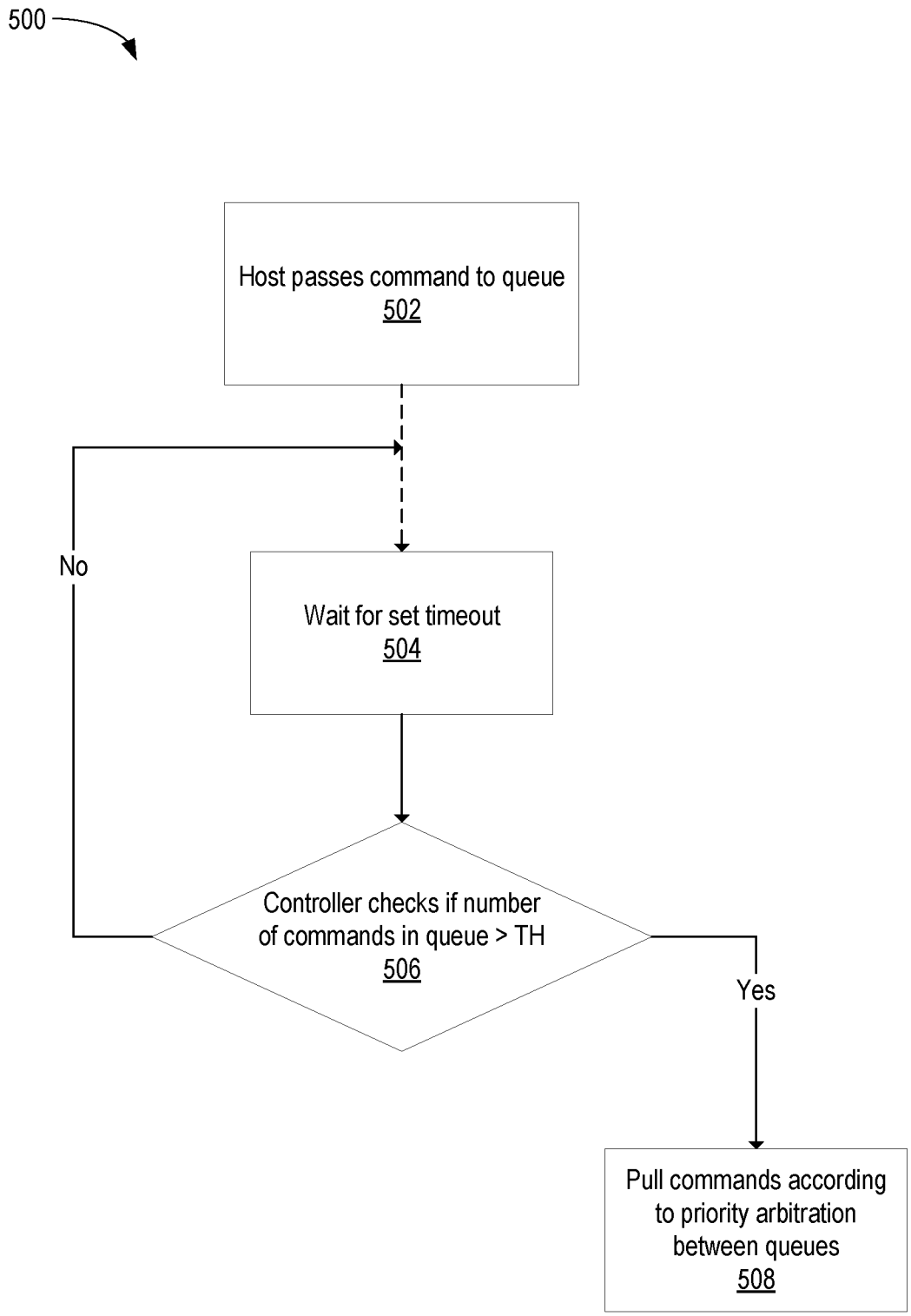
FIG. 5 is a flow chart illustrating a method for command fetching optimization, according to certain embodiments.

FIG. 5 is a flow chart illustrating a method 500 for command fetching optimization, according to certain embodiments. Command aggregation during fetching can be done by providing a pre-defined threshold of the queues capacity. Once one of the host queues exceeds a predetermined threshold (TH), command fetching will be initiated. The link is active while the controller such as the controller 108 of FIG. 1 checks how many commands are in each queue. The link will be powered down quickly without fetching the commands if there is no need to process the commands immediately.

The method 500 begins at block 502. At block 502, the host such as host 104 of FIG. 1 passes a command to a queue. At block 504, the controller waits for a set timeout. At block 506, the controller determines if number of commands in queue is greater than a TH. If the controller determines that the number of commands in queues is less than the TH then the method 500 returns to block 504. If the controller determines that the number of commands in queues is greater than the TH then the method 500 proceeds to block 508. At block 508, the controller pulls commands according to priority arbitration between queues.

In many architectures, round robin arbitration is used rather than weighted round robin. As such, the number of commands to be fetched from each queue in a burst will be fixed. It should also be noted that the NVMe standard does define a burst setting for commands, and this can be used as a scaling factor rather than as a fixed value. For example, if the host creates 4 queues and sets an arbitration burst of 4, the minimum burst value would be 16, and the threshold would be a multiple of 16.

In another embodiment, several such TH's can be defined (e.g., TH=0% (reference method), TH=25%, TH=50%, TH=75%). The TH indicates the maximum desired high watermark in host submission queue fullness. The several TH values allow flexible configuration of the trade-off between minimizing of the link up time versus latency considerations.

Figure 6:
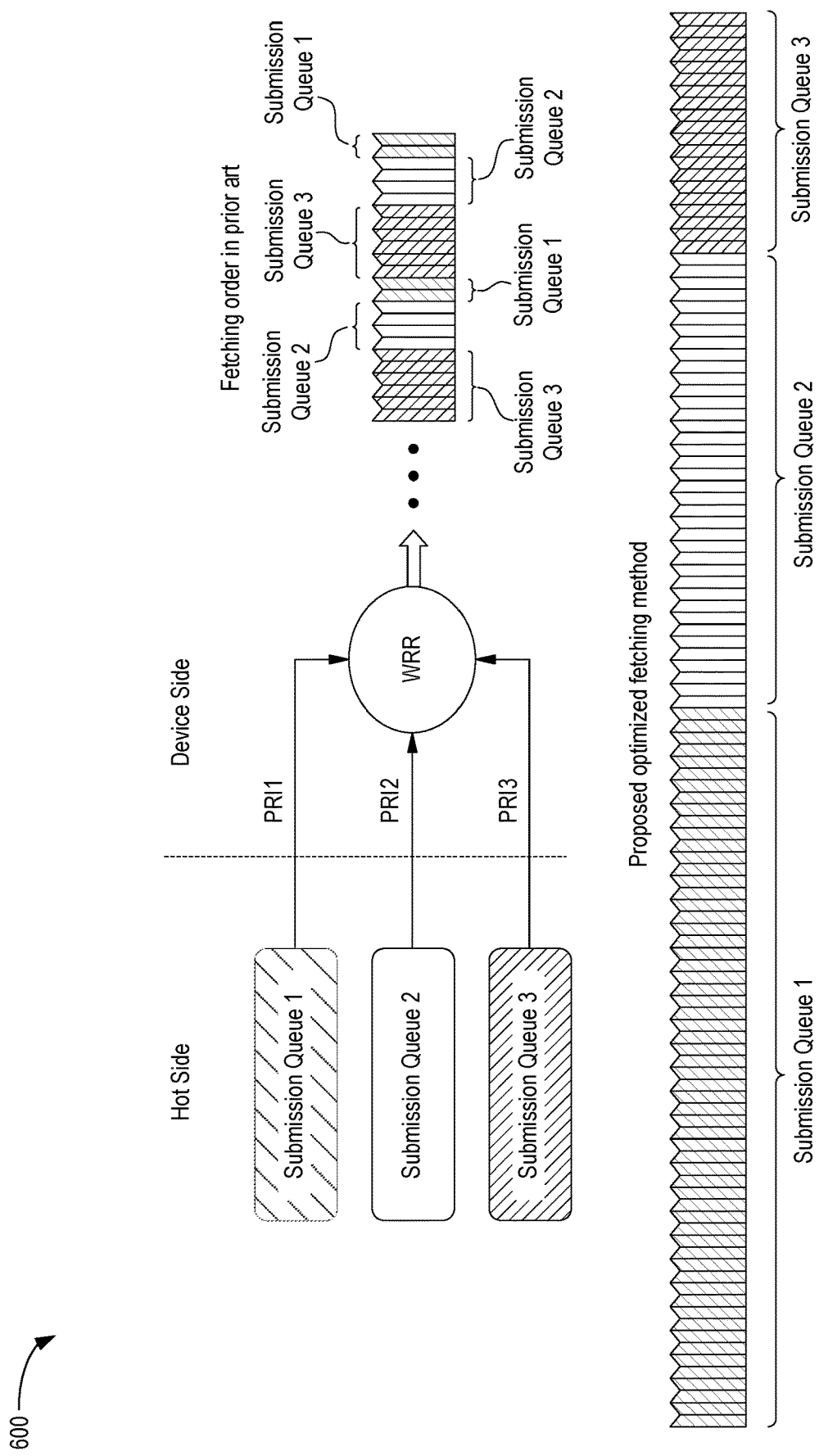
FIG. 6 shows example of optimized fetching based on PCIe properties, according to an exemplary embodiment.

FIG. 6 shows example of optimized fetching 600 based on PCIe properties, according to an exemplary embodiment. The fetching is much optimized since the chunks are bigger, which is much preferred in PCIe. The main benefit is the link efficiency while hiding the many initialization times we have in duty cycle approach.

Batch execution may be utilized to minimize link up duration. Batch execution optimizes the execution of commands (to be done in batches). In previous implementations, the link is assumed to always be active. Therefore, once completing any command, the read data can be transferred immediately back to the host such as host 104 of FIG. 1. However, in the current approach the link active time is minimized, such that the link down time is extended. Therefore, it cannot be assumed that read data will be delivered immediately to the host (as link might preferably be down most of the time).

As such, execution of commands from internal buffers of the host will be prioritized according to command batch completion criteria and not based on minimizing latency of a single command. In that manner, the batch processing involves adding special (e.g., ultra-low-footprint) hardware (HW) such as a HW engine at the storage memory that will prioritize command execution to synchronize command batch execution time. For example, command execution can be reordered from the internal buffers. Additionally and/or alternatively, the interface HW may be used. In the past, quality of service (QOS) was measured on a single command, and there was motivation to finish each single command as fast as possible. With the proposed command batch execution, the motivation is to finish the entire batch as fast as possible, without regard to individual commands.

Figure 7:
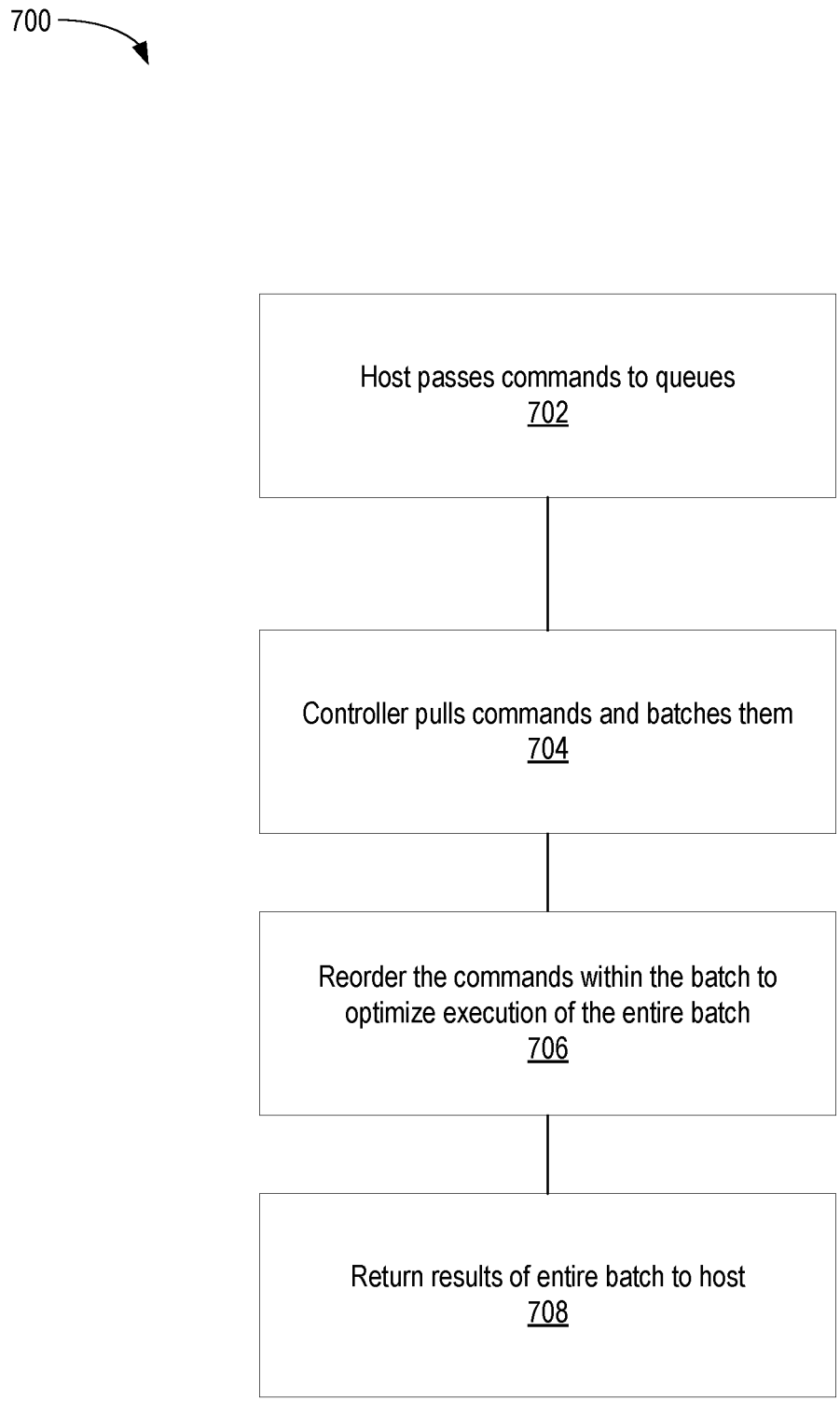
FIG. 7 is a flow chart illustrating a method for batch command execution latency optimization, according to certain embodiments.

FIG. 7 is a flow chart illustrating a method 700 for batch command execution latency optimization, according to certain embodiments. The method 700 begins at block 702. At block 702, the host such as host 104 of FIG. 1 passes commands to queues. At block 704, the controller such as controller 108 of FIG. 1 pulls commands and batches the commands. At block 706, the controller reorders the commands within the batch to optimize execution of the entire batch. At block 708, the controller returns the results of the entire batch to the host.

For example, the decoding latency of read commands by analyzing the physical health of the target die/block can be estimated. In a system with data retention (DR) tracking, the expected DR of the read data can be factored. An error correcting code (ECC) decoding system may include several decoding engines with different properties. Some decoding engines would be faster, but with lower correction capability and lower power consumption. Alternatively, other decoding engines may be slower but with higher correction capability and higher power consumption.

A short bit error rate (BER) estimation operation (syndrome weight (SW) calculation) may be done after a codeword is read from the memory. SW correlates to decode latency. Once the SW is calculated for each codeword, ordering the entire batch is easily ordered between the different decoders in the system such that overall decode latency is minimized.

Figure 8:
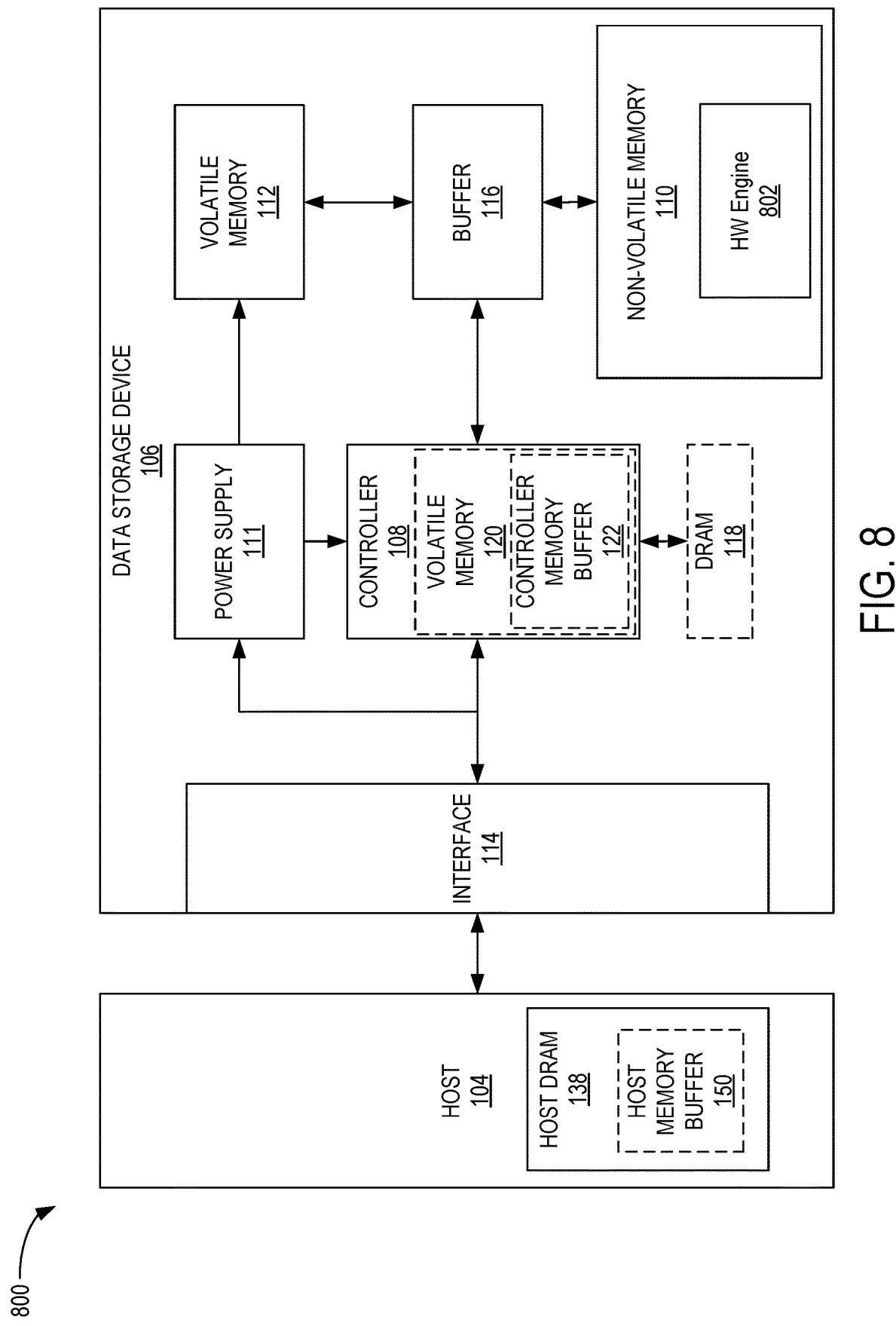
FIG. 8 is a schematic block diagram illustrating a storage system in which a data storage device may function as a storage device for a host device, according to certain embodiments.

FIG. 8 is a schematic block diagram illustrating a storage system 800 having a data storage device 106 that may function as a storage device for a host device 104, according to certain embodiments. The NVM 110 includes a hardware (HW) engine 802.

The embodiments described herein lead to special handling of command fetching and command execution such that the link up durations between the host and data storage device are minimized. Minimizing the link up time (in contrary to current assumption of Always-UP link) will result in reduced power consumption of the memory device.

In one embodiment, a data storage device comprises: a memory device; and a controller coupled to the memory device, wherein the controller is configured to: provide one or more pre-defined thresholds of host queue capacity to a host device; determine that one or more host queues has exceeded the one or more pre-defined thresholds; turn on a link between the host device and the data storage device; and fetch commands from the one or more host queues. The controller is configured to aggregate command chunks for the fetching. The controller is configured to fetch commands according to a prioritization order. The prioritization order is set by the host device. The controller is configured to fetch commands in chunks to maintain a ratio of the prioritization order. The chunks are fetched in a quantity that is a multiple of the ratio. The one or more thresholds is at least two thresholds. The controller is configured to turn off the link after the fetching. The controller is configured to wait for a set timeout after the host device passes a command to the one or more host queues.

In another embodiment, a data storage device comprises: a memory device; and a controller coupled to the memory device, wherein the controller is configured to: retrieve a plurality of commands from one or more host queues, wherein the plurality of commands is a batch; reorder the plurality of commands to optimize execution of the plurality of commands; execute the plurality of commands; and return results of the batch to a host device. The controller is further configured to estimate decoding latency of read commands of the plurality of commands, and wherein the reordering is based on the estimate. The controller is further configured to analyze health of the memory device. The data storage device of claim 10, wherein the controller is further configured to track data retention (DR). The reordering is based upon the tracked DR. The controller is configured to perform a syndrome weight (SW) calculation. The reordering is based upon the SW calculation. The controller is configured to direct the plurality of commands to different decoders based upon the SW calculation.

In another embodiment, a data storage device comprises: means to store data; and a controller coupled to the means to store data, wherein the controller is configured to: turn on a link between a host device and the data storage device upon determining that one or more queues of the host device has exceeded one or more thresholds; and fetch a plurality of commands from one or more queues; reorder the plurality of commands to optimize execution of the plurality of commands; execute the plurality of commands; and return results of the plurality of commands to the host device. The fetching comprises fetching commands according to a prioritization order, wherein the prioritization order is set by the host device, wherein the controller is configured to fetch commands in chunks to maintain a ratio of the prioritization order, and wherein the chunks are fetched in a quantity that is a multiple of the ratio. The controller is further configured to estimate decoding latency of read commands of the plurality of commands, wherein the controller is further configured to analyze health of the means to store data, wherein the controller is further configured to track data retention (DR), wherein the controller is configured to perform a syndrome weight (SW) calculation, and wherein the reordering is based on one or more of the estimate, the analyzing, the tracking, and the calculating.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
provide one or more pre-defined thresholds of host queue capacity to a host device;
determine that one or more host queues has exceeded the one or more pre-defined thresholds;
turn on, based on the determination that the one or more host queues has exceeded the one or more pre-defined thresholds, a link between the host device and the data storage device; and
fetch commands from the one or more host queues.

2. The data storage device of claim 1, wherein the controller is configured to aggregate command chunks for the fetching.

3. The data storage device of claim 1, wherein the controller is configured to fetch commands according to a prioritization order.

4. The data storage device of claim 3, wherein the prioritization order is set by the host device.

5. The data storage device of claim 3, wherein the controller is configured to fetch commands in chunks to maintain a ratio of the prioritization order.

6. The data storage device of claim 5, wherein the chunks are fetched in a quantity that is a multiple of the ratio.

7. The data storage device of claim 1, wherein the one or more thresholds is at least two thresholds.

8. The data storage device of claim 1, wherein the controller is configured to turn off the link after the fetching.

9. The data storage device of claim 1, wherein the controller is configured to wait for a set timeout after the host device passes a command to the one or more host queues.

10. A data storage device, comprising:
a memory device; and
a controller coupled to the memory device, wherein the controller is configured to:
retrieve a plurality of commands from one or more host queues, wherein the plurality of commands is a batch;
reorder the plurality of commands to optimize execution of the plurality of commands;
execute the plurality of commands;
return results of the batch to a host device; and
estimate decoding latency of read commands of the plurality of commands, wherein the reordering is based on the estimate.

11. The data storage device of claim 10, wherein the controller is further configured to analyze health of the memory device.

12. The data storage device of claim 10, wherein the controller is further configured to track data retention (DR).

13. The data storage device of claim 12, wherein the reordering is based upon the tracked DR.

14. The data storage device of claim 10, wherein the controller is configured to perform a syndrome weight (SW) calculation.

15. The data storage device of claim 14, wherein the reordering is based upon the SW calculation.

16. The data storage device of claim 15, wherein the controller is configured to direct the plurality of commands to different decoders based upon the SW calculation.

17. A data storage device, comprising:
means to store data; and
a controller coupled to the means to store data, wherein the controller is configured to:
turn on, based on a determination that one or more host queues has exceeded one or more pre-defined thresholds, a link between a host device and the data storage device;

fetch a plurality of commands from the one or more host queues;
reorder the plurality of commands to optimize execution of the plurality of commands;
execute the plurality of commands;
return results of the plurality of commands to the host device; and
estimate decoding latency of read commands of the plurality of commands,
wherein the reordering is based on the estimate.

18. The data storage device of claim 17, wherein the fetching comprises fetching commands according to a prioritization order, wherein the prioritization order is set by the host device, wherein the controller is configured to fetch commands in chunks to maintain a ratio of the prioritization order, and wherein the chunks are fetched in a quantity that is a multiple of the ratio.

19. The data storage device of claim 17, wherein the controller is further configured to analyze health of the means to store data, wherein the controller is further configured to track data retention (DR), wherein the controller is configured to perform a syndrome weight (SW) calculation, and wherein the reordering is based on one or more of the estimate, the analyzing, the tracking, and the calculating.

* * * * *